C. E. JOHANSSON.
INTERNAL GAGE.
APPLICATION FILED JUNE 17, 1916.
1,300,841.
Patented Apr. 15, 1919.
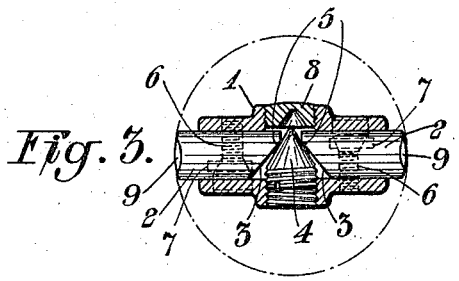
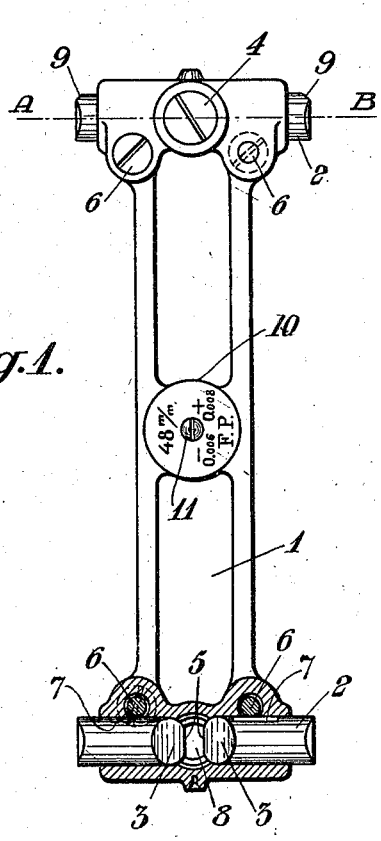 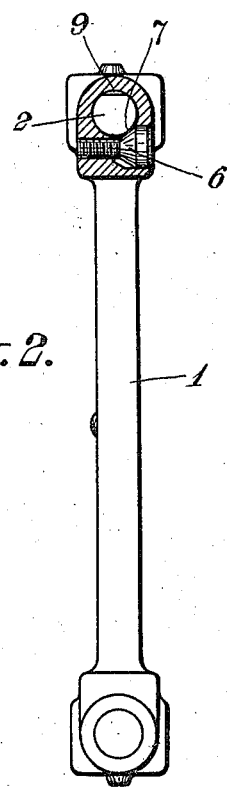
Inventor:
Carl Edward Johansson
George Bayard Jones
Atty.

UNITED STATES PATENT OFFICE.

CARL EDVARD JOHANSSON, OF ESKILSTUNA, SWEDEN, ASSIGNOR TO AKTIEBOLAGET C. E. JOHANSSON, OF ESKILSTUNA, SWEDEN.

INTERNAL GAGE.

1,300,841.  Specification of Letters Patent.  Patented Apr. 15, 1919.

Application filed June 17, 1916. Serial No. 104,338.

*To all whom it may concern:*

Be it known that I, CARL EDVARD JOHANSSON, a subject of the King of Sweden, residing at Eskilstuna, in the Kingdom of Sweden, have invented a new and useful Improvement in Internal Gages, of which the following is a specification.

This invention relates to a gage for measuring and testing holes, or internal dimensions generally, which gage is provided, in a known manner, with two measuring studs arranged in alinement in the frame of the gage and movable longitudinally therein, the inner ends of said studs being cut off obliquely, and with a conical point movable at right angles to the measuring studs and projecting in between and engaging the inner ends of the studs, for moving the studs apart. The conical point is connected, for instance, to a screw by the turning of which the measuring studs may be simultaneously adjusted. In gages of this kind, as heretofore used, the inner ends of the measuring studs are cut off or tapered in such manner that they, too, form conical points, which contact with the aforesaid conical point by means of which the adjustment is effected, along a generatrix. It being very difficult in practice, however, to form the contacting points so accurately that any unintentional obliquity is avoided, the adjustment of these old gages will become more or less uncertain and inaccurate, as it will easily occur that the contact takes place at a few points only which, furthermore, change places during the adjustment of the studs. The adjustment will also very easily become uncertain owing to foreign matters between the points.

According to the present invention these difficulties are eliminated by the studs being secured against rotation in a known manner, and by their inner ends being beveled in such manner that edges are formed on the same, which edges form angles with the generatrix of the conical point, so that the conical point contacts with the said edges of the measuring studs only at two opposite and unchanging points of the edges. In this manner it is attained that the adjustment of the measuring studs always becomes very accurate and independent of possible obliquity of the members toward one another and of foreign matters between the same.

An embodiment of the invention is illustrated in the accompanying drawing in which Figure 1 shows a plan view of the gage partly in section, and Fig. 2 shows a side view of the same, also partly in section. Fig. 3 shows a section on line A—B in Fig. 1.

The frame 1 may be made of iron, steel or the like. The measuring studs 2 of hardened steel are arranged in pairs in holes in the frame so that their inner ends may be brought to bear against each other. These inner ends of the studs are provided with beveled faces 3, which when the studs bear against one another, form a V-shaped groove with plane sides, into which groove the conical point of the screw 4 may be screwed. The angle of the conical point has a less number of degrees than the angle between the faces 3. When the screw 4 is screwed inward the point of the same will separate the studs 2 and move the same outward. On account of the point of the screw having a less number of degrees than the angle between the faces 3, the said point will bear against the edges 5 formed between the faces 3 of the studs and the end faces of the same, as shown in Fig. 3. The contact between these parts will thus be effected at two points exclusively, and the adjustment is thus prevented from becoming unsafe owing to possible foreign particles between the bearing surfaces or on account of one of the parts being askew. When the desired adjustment has been attained, each measuring stud is secured in position by means of a set screw 6 the head of which bears in a known manner against a plane surface 7 provided on the side of each stud, as clearly shown in Fig. 2. In this manner the measuring stud is securely held against turning and against moving in longitudinal direction.

The purpose of the screw plug 8, Fig. 3, is to protect the point of the screw 4 from becoming damaged and to prevent foreign matters from entering the space between the ends of the measuring studs. In the drawing one pair of measuring studs is shown provided with a beveled face 9. It is to be understood, however, that both pairs may either be provided with such faces, or not, as required, as well as that the measuring surfaces of the studs may be either plane or curved.

Fig. 1 shows the gage provided with a disk 10 secured to the same by means of a screw 11. On this disk the adjusted measures of the gage may be stamped.

I claim:

In an internal gage the combination of a frame, a screw in said frame provided with a conical point, two measuring studs arranged in alinement in said frame at substantially right angles to said screw on either side of the conical point thereof and provided with edges contacting with said conical point at two opposite points only, and means for preventing the studs from turning in the frame.

CARL EDVARD JOHANSSON.

Copies of this patent may be obtained for five cents each, by addressing the "Commissioner of Patents, Washington, D. C."